United States Patent [19]
Langberg et al.

[11] Patent Number: 5,852,630
[45] Date of Patent: Dec. 22, 1998

[54] METHOD AND APPARATUS FOR A RADSL TRANSCEIVER WARM START ACTIVATION PROCEDURE WITH PRECODING

[75] Inventors: Ehud Langberg, Ocean Township; William Scholtz, Middletown; Farooq Jabbar, Parlin, all of N.J.

[73] Assignee: Globespan Semiconductor, Inc., Red Bank, N.J.

[21] Appl. No.: 50,474

[22] Filed: Mar. 30, 1998

Related U.S. Application Data

[60] Provisional application No. 60/052,937 Jul. 17, 1997.
[51] Int. Cl.[6] .............................. H04B 1/38; H04L 5/16; H03H 7/30; H03H 7/40
[52] U.S. Cl. ...................... 375/219; 375/219; 375/222; 375/229; 375/230; 375/231
[58] Field of Search ................................. 375/222, 231, 375/230, 219, 296

[56] References Cited

U.S. PATENT DOCUMENTS

| | | | |
|---|---|---|---|
| 4,621,366 | 11/1986 | Cain et al. | 375/222 |
| 5,513,216 | 4/1996 | Gadot et al. | 375/233 |
| 5,604,769 | 2/1997 | Wang | 375/229 |
| 5,751,701 | 5/1998 | Langberg et al. | 370/281 |

*Primary Examiner*—Stephen Chin
*Assistant Examiner*—Michael W. Maddox
*Attorney, Agent, or Firm*—Thomas, Kayden, Horstemeyer & Risley

[57] ABSTRACT

A DSL communication device wherein the state of component coefficients are saved in a memory of a DSL device so that at a later time, the DSL device may initiate a warm start activation sequence wherein the last known channel parameters are used to train the equalizer, significantly reducing the amount of equalizer training required by eliminating the requirement that the aforementioned coefficients be transferred between DSL devices.

15 Claims, 6 Drawing Sheets

Fig. 5

METHOD AND APPARATUS FOR A RADSL TRANSCEIVER WARM START ACTIVATION PROCEDURE WITH PRECODING

CROSS REFERENCE TO RELATED APPLICATION

This document claims priority to and the benefit of the filing date of co-pending and commonly assigned U.S. Provisional patent application entitled SYSTEM AND METHOD FOR A RADSL TRANSCEIVER WARM START ACTIVATION PROCEDURE WITH PRECODING, assigned Ser. No. 60/052,937, and filed Jul. 17, 1997 and is hereby incorporated by reference.

FIELD OF THE INVENTION

The present invention relates generally to the transmission of voice and data signals between a remote location and a central office, and more particularly, to a method and apparatus for a warm start activation procedure that incorporates precoding for a rate adaptive digital subscriber line transceiver.

BACKGROUND OF THE INVENTION

The field of data communications typically uses modems, or communication devices, to convey information from one location to another. Digital Subscriber Line (DSL) technology now enables devices to communicate rapidly large amounts of data. DSL communications devices communicate by modulating a baseband signal carrying digital data, converting the modulated digital data signal to an analog signal, and transmitting the analog signal over a conventional copper wire pair using techniques that are known in the art. These known techniques include mapping the information to be transmitted into a signal space constellation, encoding the information to reduce errors and improve throughput, and transmitting the information over a communication channel. The information is mapped into the signal space constellation and can include both analog and digital information or often merely digital information.

At a receiver, the transmitted information is received, equalized and decoded in accordance with techniques that those skilled in the art will appreciate.

In the above mentioned communications system, a control device, i.e., one that is located at a telephone company central office, connects on the communication channel to a remote device, typically located at a customer residential or business location.

Currently, transmission of information, whether voice or data, between a customer location and a central office typically occurs at one rate of speed in each direction. This rate is usually determined by the transceiver or modem in use at a particular location for a particular application. With the introduction of rate adaptive data applications, such as fractional T1 and E1 services and multirate ISDN, it is advantageous to expand the use of the existing copper pair wire to support these rate adaptive digital subscriber line (RADSL) applications, while retaining the ability to support plain old telephone service (POTS) simultaneously on the same line.

In order to establish a communications connection between the central office device and the remote device, a lengthy preamble, which allows the devices to synchronize at the start of each message, is required. This preamble includes a training phase wherein the devices negotiate an acceptable data transfer rate based upon channel characteristics at the time of connection. This results, however, in a relatively lengthy exchange. Accordingly, it is desirable to provide an alternative system that can significantly reduce the steps required once the initial training phase is complete and thus reduce the training time required for subsequent transmissions.

SUMMARY OF THE INVENTION

The method and apparatus for a RADSL transceiver warm start activation procedure with precoding provides an improvement to a DSL communication environment by enabling a DSL device to establish a communication connection using the last known channel parameters, thereby reducing the training time required for connection. By employing the method and apparatus for a RADSL transceiver warm start activation sequence with precoding, a DSL device can dramatically reduce the connection time required to re-establish a reliable communication path.

In accordance with one aspect of the present invention, the preferred embodiment provides a method for providing a shortened warm-start training sequence for a transceiver that is communicating data with another transceiver, comprising the following steps. Either a control device or a remote device initiates a request to enter a standby mode. If a standby mode is requested by either device, the state of the transmitters precoder and the state of the receivers equalizer of each device are saved to respective memory locations. Other parameters, such as adaptive gain control (AGC) and the steady state phase error of the phase locked loop are also saved to memory. While in standby mode, either device may initiate the warm start activation sequence of the present invention by requesting that the other device awaken and exit the standby mode. Next, the precoder and equalizer coefficients stored in memory are restored to the precoder and equalizer. At this time a shortened training sequence is performed to ascertain the correct phase of the communication channel and adjust the equalizer accordingly.

The equalizer is adjusted by generating an error signal, the error signal being the difference between a received signal and an ideal reference signal, and supplying the error signal to the equalizer for training. In addition, the warm start with precoding algorithm of the present invention includes the step of training a noise predictive filter using a noise estimate signal. The noise predictive filter is used to supply a noise estimate signal that is subtracted from the received signal. The noise estimate signal is generated by adding the received signal having the output of the noise predictive filter subtracted therefrom with an ideal reference signal. Once this abbreviated training sequence is complete, the remote device and control device resume normal data communication operation.

In accordance with another aspect of the present invention, the preferred embodiment also includes an improved transceiver having a transmitter including a precoder and a receiver including an equalizer. The transmitter further includes means for saving the state of the precoder after training and the receiver further includes means for saving the state of the equalizer after training. Also included is means for performing a warm start activation sequence, including means for restoring the state of the precoder and the equalizer. The apparatus also includes means for adjusting the equalizer by generating an error signal, the error signal being the difference between a received signal and an ideal reference signal. Also included is means for training a noise predictive filter using a noise estimate signal, wherein the noise estimate signal is generated by adding the received signal having the output of the noise predictive filter subtracted therefrom with an ideal reference signal.

The invention has numerous advantages, a few of which are delineated hereafter, as merely examples.

An advantage of the present invention is that it significantly reduces the training time required to re-establish a reliable connection between two DSL communication devices.

Another advantage of the present invention is that it simplifies the training necessary between two DSL devices attempting to re-establish a data transfer connection.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The method and apparatus for a RADSL transceiver warm start activation procedure with precoding, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE PREFERRED EMBODIMENT

The method and apparatus for a RADSL transceiver warm start activation procedure with precoding can be implemented in software, hardware, or a combination thereof. In the preferred embodiment, the elements of the present invention are implemented in software that is stored in a memory and that configures and drives a suitable digital signal processor (DSP) situated in a communication device. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

Figure 1:
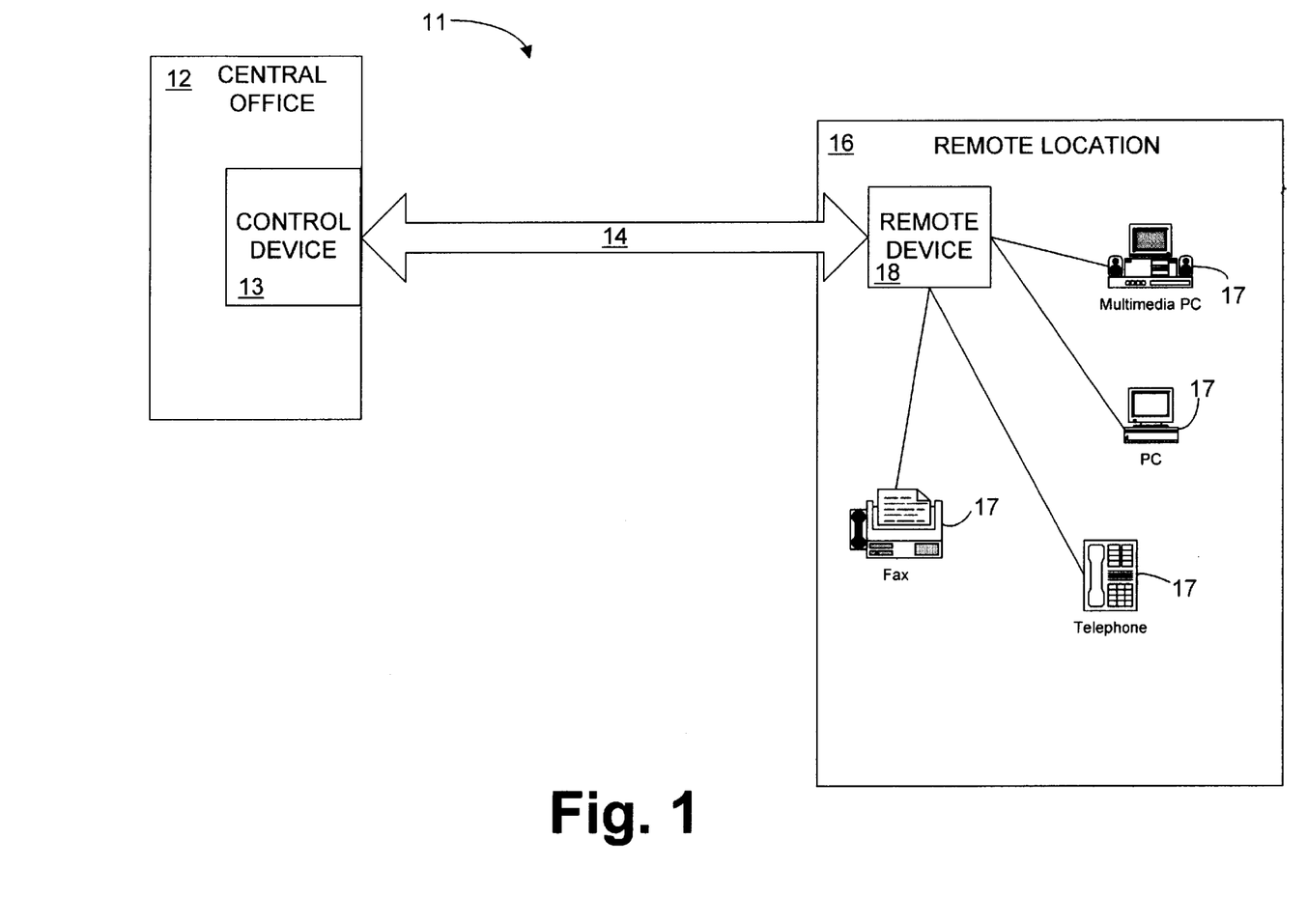
FIG. 1 is a schematic view illustrating a communications environment employing DSL devices having the warm start with precoding algorithm of the present invention.

FIG. 1, is a schematic view illustrating a communications environment 11 in which communication devices employing the warm start with precoding algorithm of the present invention reside. Remote location 16 is connected to central office location 12 via communication channel 14. Located at central office location 12 is control device 13. Communication channel 14 is typically the copper wire pair that extends between a telephone company central office and a remote residential, business, or any other location served by local telephone service. Remote location 16 may contain a remote DSL device 18 connecting a plurality of user devices 17 to communication channel 14. By using control device 13 and remote device 18 employing the concepts and features of the warm start with precoding algorithm, it is possible for control device 13 or remote device 18 to initiate and complete a warm start activation sequence, thereby significantly reducing the amount of time required to train the equalizers in the receivers of devices 13 and 18 and reestablish a data connection. The present invention resides both in control device 13 and remote device 18, and can be initiated by either device.

Figure 2:
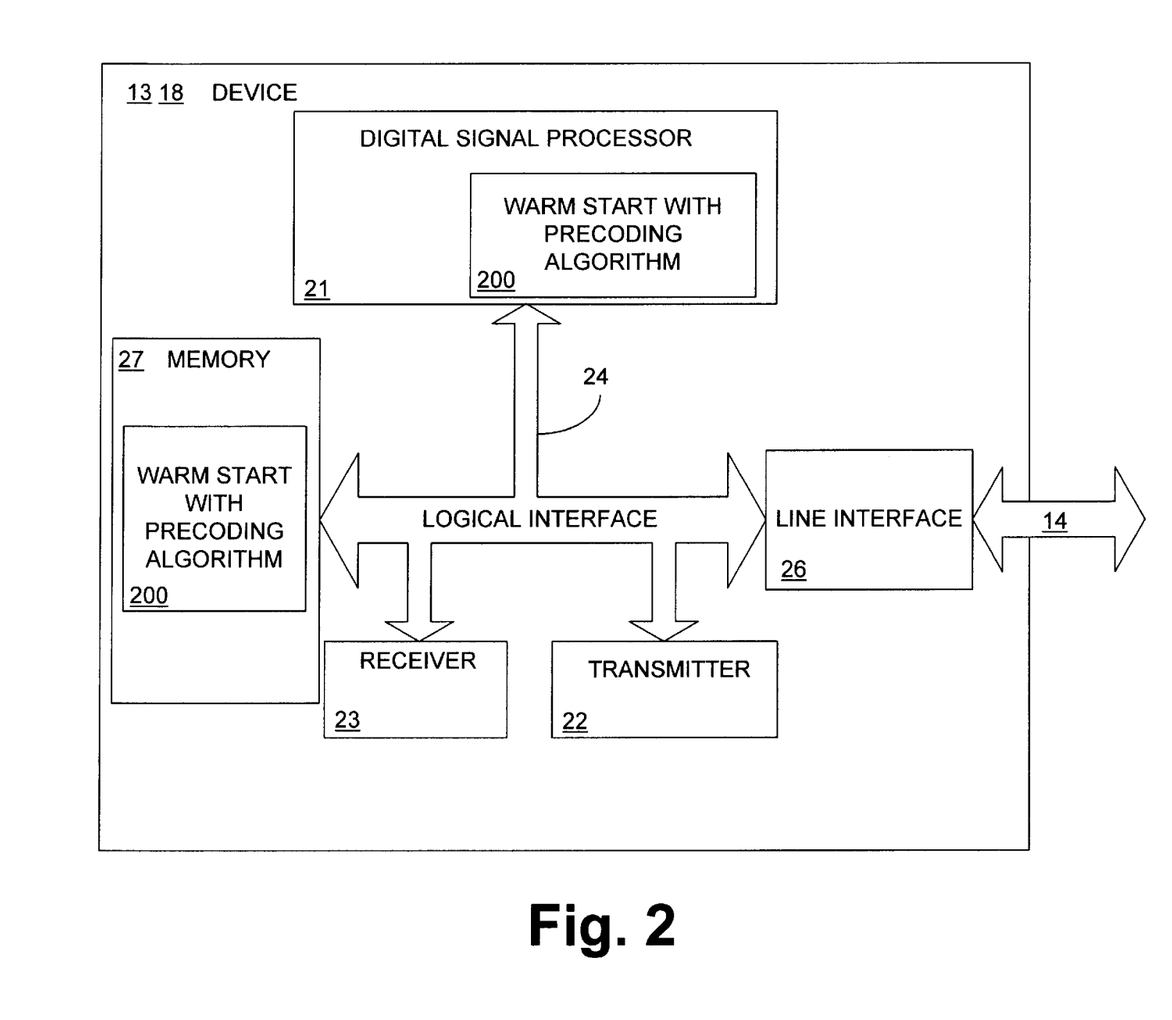
FIG. 2 is a block diagram of the communications device of FIG. 1 including the warm start with precoding algorithm.

Now referring to FIG. 2, shown is a block diagram illustrating both device 13 and 18 of FIG. 1 including the warm start with precoding algorithm of the present invention. Because the present invention resides in both control device 13 and remote device 18, the discussion of the operation of the invention with respect to remote device 18 is equally applicable to control device 13.

Still referring to FIG. 2, both control device 13 and remote device 18 contain conventional components as is known in the art of data communications. Digital Signal Processor (DSP) 21 controls the operation of the device's transmitter 22 and receiver 23 through logical interface 24, and couples to line interface 26 to gain access to communications channel 14. Also included in DSP 21 is the warm start with precoding algorithm 200. Because warm start with precoding algorithm 200 is an algorithm, it is also depicted as residing within memory 27. In a preferred embodiment, the present invention is an algorithm that is executed in DSP 21, however, for simplicity, the warm start with precoding algorithm will be described with reference to discrete blocks in FIGS. 4A and 4B. Furthermore, while illustrated using discrete blocks, communication devices 13 and 18 can reside completely within DSP 21, requiring only line interface 26 to gain access to communication channel 14.

Before the warm start with precoding algorithm 200 can be employed, both control device and remote device should be in standby mode. Entering standby mode includes the saving of respective memory states such as precoder and equalizer coefficients for later use in reestablishing the connection.

Figure 3:
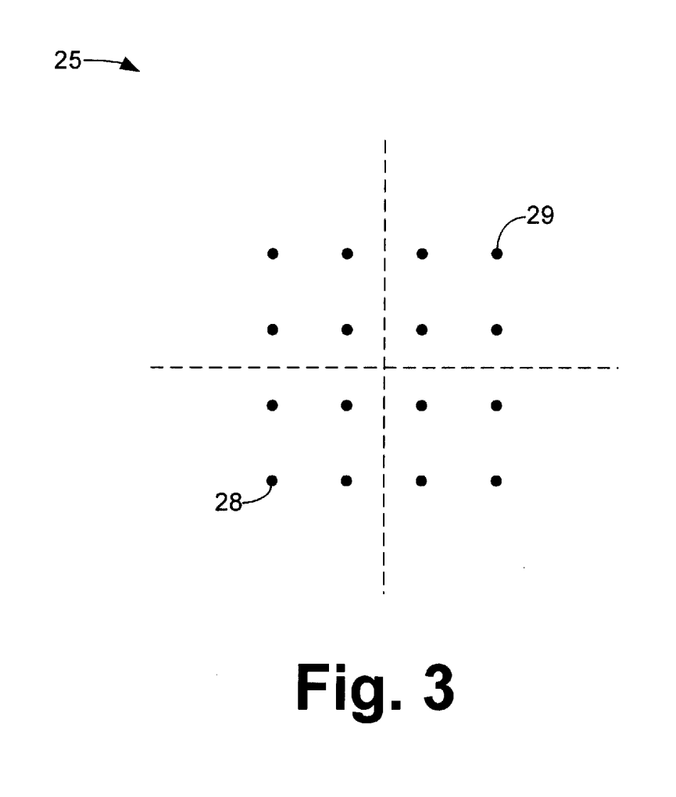
FIG. 3 is a schematic diagram illustrating the signal constellation transmitted by the device of FIG. 2, while requesting standby mode.

With reference now to FIG. 3, shown is the N-CAP signal constellation 25 used by the device of FIG. 2 to enter the standby state.

Either control device 13 or remote device 18 can request to enter standby mode. A standby request may be either disruptive or non disruptive. A non disruptive request uses a secondary channel, which may be available for certain connections and is known in the art of data communications. Because the data channel in use is not affected, normal data transfer takes place during the non disruptive request.

Figure 4A:
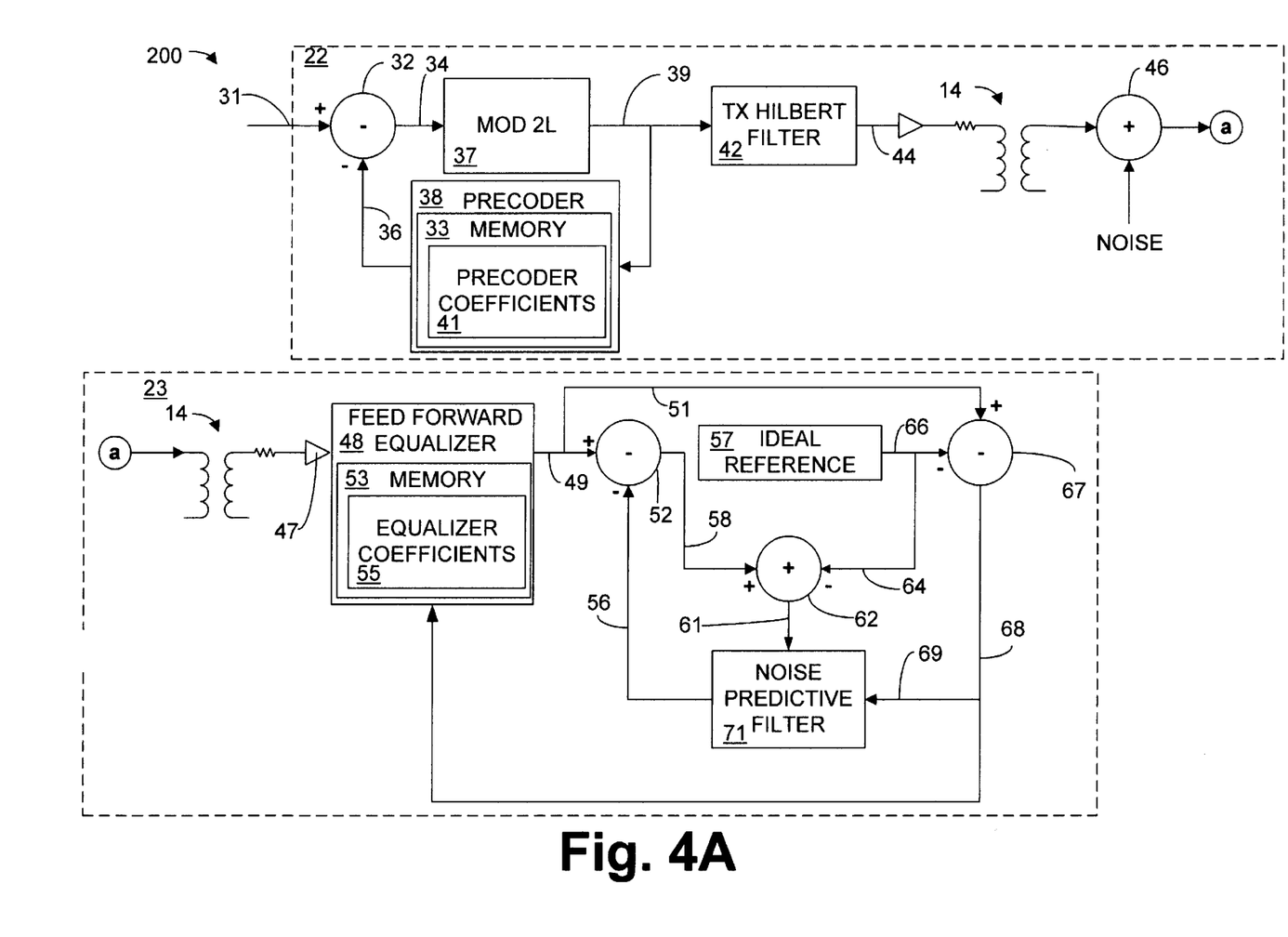
FIG. 4A is a block diagram illustrating the transmitter and receiver of the DSL device of FIG. 2 in ideal reference training mode.

In the case of a disruptive request the requesting device sends a 2 symbol sequence, illustrated using symbols 28 and 29 of constellation 25, for a predetermined time in data mode. The receiving device detects this symbol pattern and enters standby mode. This pattern is a sequence of two symbols out of the final N-CAP constellation having the same I and Q values. Upon detection of the pattern, the state of the transceiver is saved to be used later for the warm start activation sequence. Referring now to FIG. 4A, this includes saving the state of precoder 38 in memory 33, saving the state of feed forward equalizer 48 in memory 53, and saving the state of the AGC and steady state phase error of the phase locked loop, the details of which will be described in detail with respect to FIGS. 4A and 4B.

With reference now to FIG. 4A, illustrated is a block diagram of the transmitter and receiver of the DSL device of FIG. 2 in ideal reference training mode. The ideal reference equalizer training at the receiver, as known in the art, is modified for use with precoded data during warm start.

Ideal reference training is a scheme where channel characteristics are estimated by sending a sequence of symbols selected from a known signal constellation. A receiver then searches for these symbols at the proper time and computes the error between the received and the actual "ideal" symbol. This error is then used to update and train an equalizer. As will be discussed hereafter with respect to FIG. 4B, after a predetermined time, the transmitter stops sending the ideal sequence and begins sending random data. The receiver will then make it's decisions as to which symbol was sent depending on the received value. The error is then computed as the difference of the detected signal and the closest symbol in the signal set. Because the receiver makes a decision about the transmitted symbol, this processing is called decision-directed training. A signal containing training data to be transmitted is input on line 31 to subtractor 32. Also input to subtractor 32 on line 36 is data from precoder 38. Precoder 38 further includes memory 33, which is used to store the precoder coefficients 41 in accordance with the principles of the present invention. The output of subtractor 32 on line 34 is a precoded data signal that contains an expanded signal set and is input to modulus converter 37.

Modulus converter 37 folds the signal back into, in this preferred embodiment, a 2 L signal space as known in the art. This conversion is necessary to modulate and transmit the data signal, which was expanded as a result of precoding.

The output of modulus converter 37 on line 39 is supplied as input to precoder 38 and as input to TX Hilbert Filter 42. TX Hilbert filter 42 is used to modulate the signal using multidimension CAP modulation. For such CAP schemes, a transmit filter pair is employed with one transmit filter having the hilbert characteristic of the other. Additionally, the present invention is equally applicable to quadrature amplitude modulation (QAM), baseband pulse amplitude modulation (PAM), and many other modulation schemes. The modulated signal is then sent on line 44 for transmission over communication channel 14 as will be appreciated by those skilled in the art.

Illustratively noise, which distorts the communication signal, is depicted as added to communication channel 14 in adder 46. Still referring to FIG. 4A, the received signal is received on line 47 for input to equalizer 48. Some of the details of transmission over communication channel 14, such as mapping the data into a signal space constellation, encoding the data to be transmitted, and converting the data to and from the digital domain have been omitted as they are known to those skilled in the art.

Equalizer 48 further includes memory 53, which is used to store the equalizer coefficients 55 in accordance with the principles of the present invention. Equalizer 48 also receives as input an error signal developed by subtracting, in subtractor 67, an ideal reference signal on line 66 supplied by ideal reference source 57, from the output of equalizer 48 on line 51, which is the received symbol. Ideal reference source 57 is a known sequence of symbols that represents the actual value of the symbols transmitted by the transmitter. The output of subtractor 67 is the error signal supplied on line 68 that is used to train the feed forward equalizer 48.

The output of ideal reference source 57 is also supplied on line 64 to adder 62. Adder 62 adds the ideal reference source signal on line 64 with the output of subtractor 52. The output of subtractor 52 on line 58 is the received signal on line 49 minus the channel noise estimate on line 56. The output of adder 62 is supplied on line 61 to noise predictive filter 71. The signal on line 61 is the difference between the received symbol on line 58 and the actual symbol generated by ideal reference source 57 on line 64 and is the noise estimate signal used to train noise predictive filter 71. Subtractor 67 also supplies an error signal input to noise predictive filter 71 on line 69.

For two dimensional modulation schemes like Quadrature Amplitude Modulation (QAM) and Carrierless Amplitude-Phase (CAP) modulation, transmitter precoding 38 expands the transmit signal set such that the original signal set gets replicated in both dimensions. This expanded signal set forms an infinite grid of symbols. At a receiver, the symbols are detected by wrapping this infinite grid back into the original constellation using a modulo operation before making a decision. The training is then continued as in the decision-directed mode.

During a warm start, the last known precoder coefficients 41 are saved and used in order to bypass the lengthy Tomlinson training phase and, therefore, shorten startup time. This means that both the control device transmitter and the remote device transmitter are operating with their respective precoders engaged. While it is possible to begin with decision-directed training at the remote site, it cannot be done at the control side because of timing phase ambiguity in the control device during warm start.

To perform ideal reference training with the precoded data during warm start, the symbol error cannot be computed as the simple difference previously described. Although the transmitted ideal symbol is known, the precoder can place it anywhere in the infinite grid and its actual location in the grid, or constellation, cannot be determined by a modulo operation. To compute the error, a receiver has to know which replica of the original set the received symbol belongs to. It can then use the closest symbol in that replica to compute error. This information is not available at the receiver though. Moreover, an imperfect equalizer at the beginning of the training phase will cause the symbols to fall in the wrong copy of the set, a situation exacerbated by an improper phase.

The warm start with precoding algorithm 200 of the present invention assumes that symbols received around the origin of the infinite grid, belonging to the original set, are actually transmitted at those locations. Receiver 23 can, therefore, use a subset of points in the signal constellation to compute the error and train the equalizer. Choosing a subset from the original set of symbols provides the true error and the equalizer converges to an optimum solution, however, it slows down training since there are less updates per transmitted sequence.

The adaptive path of equalizer 48 is an iterative algorithm forming a line moving down the surface of an N-dimensional parabolic bowl, where N is the number of coefficients of the equalizer. The surface of the bowl is the error which decreases as the algorithm steps down the surface and attains a minimum value at the bottom of the bowl. The coefficients have the optimum values at this point.

In the case of warm start, non-linear modulo operation 37 in precoder 38, performing ideal reference training, as in FIG. 4A, affects the monotonicity of the error surface and can create what is known in the art as local minima, or false bottom. Although the error can be large at one of these minimas, the coefficients stop adapting momentarily. The recovered constellation may have proper phase at this point, but will have smaller amplitude.

The warm start with precoding algorithm 200 initially uses aggressive equalizer coefficient update step sizes to do coarse adaptation. Larger step sizes have the ability to move the coefficients out of any local minimum and fall toward the true minimum at the bottom of the bowl. This arrangement shortens overall training.

Figure 5:
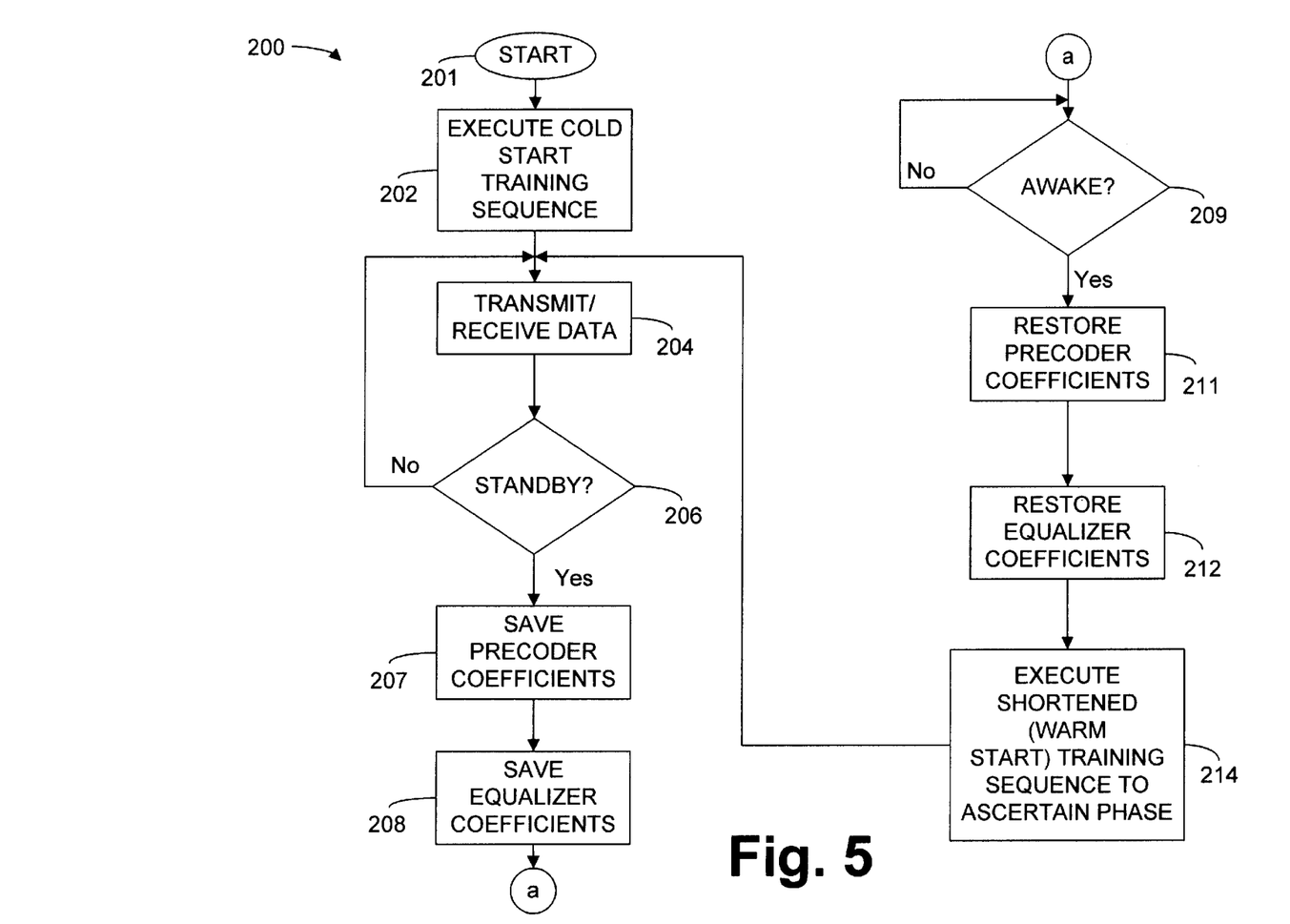
FIG. 5 is a flowchart illustrating the operation of a preferred embodiment of the present invention.

Referring now to FIG. 5, shown is a flowchart 200 illustrating the operation of the present invention. Start block 201 assumes that no previous channel parameters have been stored by either control device 13 or remote device 18. In block 202, either control device 13 or remote device 18 initiate and complete a standard call establishment sequence including a conventional training phase as will be appreciated by those skilled in the art of data communications.

Once the cold start initialization and connection process is complete, both control device 13 and remote device 18 enter a data communication mode and begin the exchange of information as illustrated in block 204. Either control device 13 or remote device 18 can at any time send a standby request packet as illustrated in decision block 206, thereby signaling to the opposite device a request to enter standby mode. At this time, both control device 13 and remote device 18 will save the current state of their precoder (block 207) and equalizer (block 208) by saving the coefficients of their respective memory devices.

While in standby mode, either control device 13 or remote device 18 can "awaken" the other by sending an alerting sequence as depicted in block 209. Upon receipt of this alerting sequence, the receiving device will acknowledge receipt of the alerting request, and thereafter, both control device 13 and remote device 18 will restore the saved memory coefficients to their respective precoders and equalizers as depicted in blocks 211 and 212, and as illustrated in FIG. 4A.

While shown as a sequential operation, the step of restoring the memory coefficients may occur in any order, or indeed, may occur simultaneously. Furthermore, other memory parameters are saved and restored, namely, the steady state phase error of the phase locked loop and AGC.

The warm start with precoding algorithm activation sequence is as follows. Once the state of the memory devices are restored, the system will continue the warm start activation sequence in block 214. The balance of the warm start activation sequence will be described referring to FIGS. 4A and 4B. Initially the remote device 18 will execute a short timing recovery phase. Here, the training starts with the steady state phase error saved from the previous connection.

First, control device 13 is trained using a 4-CAP ideal reference signal for a predetermined time. This training is accomplished using ideal reference output 66 to train control device 13 while precoder 38 in remote device 18 is engaged. In this preferred embodiment ideal reference training is done with the precoder 38 and MOD 2 L structure 37 present in transmitter 22. Following the ideal reference signal training, control device 13 and remote device 18 can negotiate the constellation size and speed. The control device 13 constellation is then switched to this final N-CAP constellation. Once the final N-CAP constellation is engaged, control device 13 momentarily executes decision directed training. N-CAP signifies a signal constellation in carrierless amplitude/phase modulation (CAP) having N constellation symbols as is known in the art of communications. Other modulation schemes such as QAM can benefit equally using the principles of the present invention.

Figure 4B:
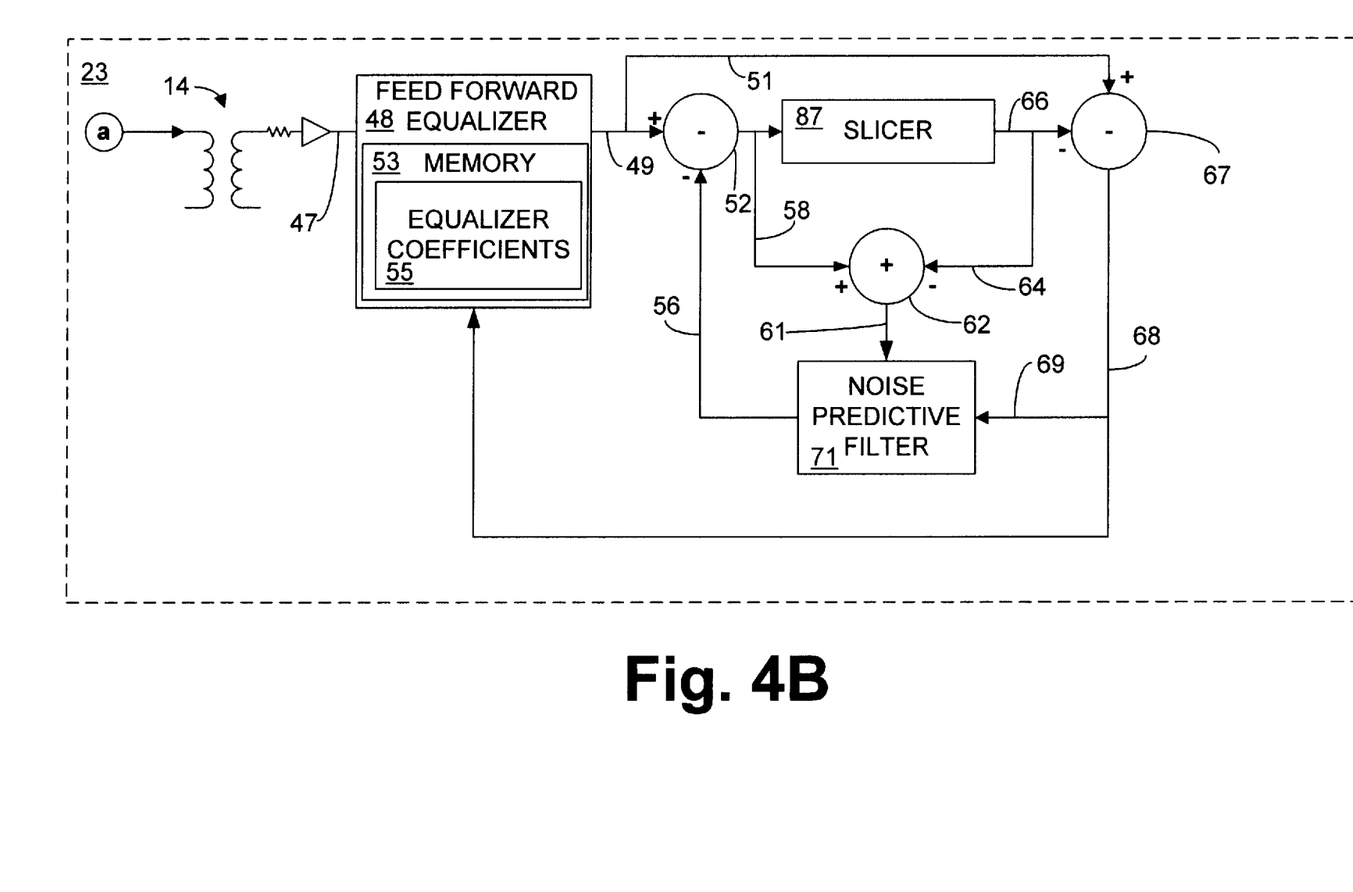
FIG. 4B is a block diagram illustrating the receiver of the DSL device of FIG. 2 in decision directed training mode.

Decision directed training is illustrated in FIG. 4B. The components shown in FIG. 4B having like reference numerals to those of FIG. 4A perform the identical function and will not be discussed in detail. Slicer 87 in FIG. 4B is substituted for ideal reference source 67 of FIG. 4A. Slicer 87 enables device 13, 18 to perform decision directed training by allowing feed forward equalizer 48 to train on the received signal. The received signal on line 58 is supplied to slicer 87 and adder 62. Adder 62 subtracts the output of slicer 87 on line 64 from the received signal on line 58 and supplies, on line 61, the noise estimate signal used to train noise predictive filter 71 in this decision directed training mode.

In this example, remote device 18 goes through 4-CAP decision directed training while control device 13 is in ideal reference training mode. Remote device 18 switches to the final N-CAP constellation at the same time that control device 13 switches to its final constellation and continues training in decision directed mode until the termination of the shortened training phase.

It will be obvious to those skilled in the art that many modifications and variations may be made to the preferred embodiments of the present invention, as set forth above, without departing substantially from the principles of the present invention. For example, modulation schemes other than CAP modulation can be used while practicing the concepts of the present invention. All such modifications and variations are intended to be included herein within the scope of the present invention, as defined in the claims that follow.

Therefore the following is claimed:

1. A method for providing a shortened warm-start training sequence for a transceiver that is communicating data with another transceiver, comprising the steps of:

processing a request to enter a standby mode, saving the state of a precoder at a transmitter;

saving the state of an equalizer at a receiver;

receiving a request to exit the standby mode and resume data transmission;

restoring the saved precoder state to the precoder;

restoring the saved equalizer state to the equalizer;

performing a shortened training sequence to ascertain the correct phase of a communication channel; and adjusting the equalizer accordingly.

2. The method as defined in claim 1, wherein the step of saving the state of said precoder and said equalizer includes saving coefficients to a memory.

3. The method as defined in claim 1, wherein the step of adjusting said equalizer is performed by generating an error signal, said error signal being the difference between a received signal and an ideal reference signal.

4. The method as defined in claim 1, further including the step of training a noise predictive filter using a noise estimate signal.

5. The method as defined in claim 4, wherein said noise estimate signal is generated by adding the received signal having the output of a noise predictive filter subtracted therefrom with an ideal reference signal.

6. A transceiver apparatus having a transmitter including a precoder and a receiver including an equalizer, the apparatus comprising:

means for saving the state of the precoder after training;

means for saving the state of the equalizer after training; and means for performing a warm start activation sequence, including means for restoring the state of said precoder and said equalizer.

7. The apparatus as defined in claim 6, wherein an awaken signal is used in order to request said warm start activation sequence.

8. The apparatus as defined in claim 6, further comprising means for adjusting said equalizer by generating an error signal, said error signal being the difference between a received signal and an ideal reference signal.

9. The apparatus as defined in claim 6, further comprising means for training a noise predictive filter using a noise estimate signal.

10. The apparatus as defined in claim 9, wherein said noise estimate signal is generated by adding the received signal having the output of a noise predictive filter subtracted therefrom with an ideal reference signal.

11. A computer readable medium having a program for providing a shortened warm-start training sequence for a transceiver that is communicating data with another transceiver, the program comprising:

means for processing a request to enter a standby mode;

means for saving the state of a precoder at a transmitter;

means for saving the state of an equalizer at a receiver;

means for receiving a request to exit the standby mode and resume data transmission;

means for restoring the saved precoder state to the precoder;

means for restoring the saved equalizer state to the equalizer;

means for performing a shortened training sequence to ascertain the correct phase of a communication channel; and means for adjusting the equalizer accordingly.

12. The program as defined in claim 11, wherein said means for saving the state of said precoder and said equalizer includes saving coefficients to a memory.

13. The program as defined in claim 11, wherein said means for adjusting said equalizer is performed by generating an error signal, said error signal being the difference between a received signal and an ideal reference signal.

14. The program as defined in claim 1, further including means for training a noise predictive filter using a noise estimate signal.

15. The program as defined in claim 14, wherein said noise estimate signal is generated by adding the received signal having the output of a noise predictive filter subtracted therefrom with an ideal reference signal.

* * * * *